United States Patent [19]

Lundberg et al.

[11] 4,313,862
[45] Feb. 2, 1982

[54] PROCESS FOR GELATION OF POLYMERIC SOLUTION (C-1042)

[75] Inventors: Robert D. Lundberg, Bridgewater, N.J.; Henry S. Makowski, late of Scotch Plains, N.J., by Patricia Helen Makowski, executrix; Dennis O'Brien, Houston, Tex.; Robert R. Klein, Berkeley Heights, N.J.

[73] Assignee: Exxon Research & Engineering Co., Florham Park, N.J.

[21] Appl. No.: 136,835

[22] Filed: Apr. 3, 1980

Related U.S. Application Data

[63] Continuation-in-part of Ser. No. 930,044, Aug. 1, 1978, abandoned, and Ser. No. 106,027, Dec. 21, 1979, Pat. No. 4,282,130.

[51] Int. Cl.$^3$ ............................................. C08F 8/36
[52] U.S. Cl. ........................................ 260/29.6 SQ
[58] Field of Search ................. 260/29.6 E, 29.6 N, 260/29.6 PM, 29.6 SQ, DIG. 31; 525/344

[56] References Cited

U.S. PATENT DOCUMENTS

| | | | |
|---|---|---|---|
| 2,809,959 | 10/1957 | Roth | 260/29.6 SQ |
| 2,813,087 | 11/1957 | Roth | 525/344 |
| 3,554,287 | 1/1971 | Eilers | 260/29.2 EP |
| 3,870,841 | 3/1975 | Makowski | 260/DIG. 31 |
| 4,157,432 | 6/1979 | Lundberg | 525/344 |
| 4,226,751 | 10/1980 | Lundberg | 260/DIG. 31 |

*Primary Examiner*—Paul R. Michl
*Attorney, Agent, or Firm*—Richard E. Nanfeldt

[57] ABSTRACT

The present invention relates to a process for forming a polymeric solution or gel having a viscosity of at least about 50,000 cps which includes the steps of dissolving an unneutralized or neutralized sulfonated polymer in a solvent to form a solution, a concentration of the unneutralized or neutralized sulfonated polymer in the solution being about 0.1 to about 20 wt. %, a viscosity of the solution being less than about 20,000 cps; and adding about 5 to about 500 vol. % water to the solution having a viscosity less than about 20,000 cps, the water being immiscible with the solvent and the solution, the viscosity of said solution increasing rapidly upon the addition of said water from less than 20,000 cps to greater than 50,000 cps.

25 Claims, No Drawings

PROCESS FOR GELATION OF POLYMERIC SOLUTION (C-1042)

CROSS-REFERENCE TO RELATED APPLICATIONS

This application is a continuation-in-part of U.S. Ser. No. 930,044, filed Aug. 1, 1978 abandoned.

This application is also a continuation-in-part of U.S. Ser. No. 106,027, Dec. 21, 1979, now U.S. Pat. No. 4,282,130.

BACKGROUND OF THE INVENTION

1. Field of the Invention

The present invention relates to a process for forming a polymeric solution of gel having a viscosity of at least about 50,000 cps which includes the steps of dissolving an unneutralized or neutralized sulfonated polymer in a solvent to form a solution, a concentration of the unneutralized or neutralized sulfonated polymer in the solution being about 0.1 to about 20 wt. %, a viscosity of the solution being less than about 20,000 cps; and adding about 5 to about 500 vol. % water to the solution having a viscosity less than about 20,000 cps, the water being immiscible with the solvent and the solution, the viscosity of said solution increasing rapidly upon the addition of said water from less than 20,000 cps to greater than 50,000 cps.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution of an ionic polymer into a very viscous or gelled system via a rapid process which under certain conditions can be reversed. The potential applications for this process and the products derived therefrom will be evident in the instant application.

There are major problems in the direct preparation of viscous polymer solutions or gels via conventional techniques such as polymer dissolution. For example, attempts to form a high viscosity (>500,00 cps) solution of polystyrene in a suitable solvent such as xylene can be difficult. The levels of polymer required are either very high (20 to 50 wt. % concentration) or the molecular weight of the polymer must be extremely high. In either event the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

There are various chemical approaches to the solution of the problems outlined above, that is polymer chain lengthening reactions which can occur to give viscous solutions such as by the reaction of hydroxyl terminated polymers with diisocyanates etc. Such processes have inherent disadvantages which preclude their use in the intended applications of this invention.

The instant invention describes a process which permits (1) the preparation of polymer solutions of sulfonated polymers in organic liquid having reasonably low viscosities (i.e., less than about 20,000 cps), (2) the preparation of extremely viscous solutions or gels from such solutions by the simple process of mixing water with the polymer solution and (3) the reversion of such viscous solutions or gels to relatively low viscosity mixtures by the reincorporation of polar cosolvents which are water immiscible at a desired stage. These operations are achieved by the use of the appropriate concentration of polymers having low concentrations of ionic groups present, preferably metal sulfonate groups. Such polymers are described in detail in a number of patents (U.S. Pat. Nos. 3,836,511; 3,870,841; 3,847,854; 3,642,728; 3,921,021) which are herein incorporated by reference. These polymers possess unusual solution characteristics some of which are described in U.S. Pat. No. 3,931,021. Specifically such polymers such as lightly sulfonated polystyrene containing about 2 mole % sodium sulfonate pendant to the aromatic groups are typically not soluble in solvents commonly employed for polystyrene itself. However, the instant invention describes a select class of unneutralized or neutralized sulfonated polymers which readily dissolve in selected solvents. The sulfonate groups of the sulfonated polymers are neutralized with a counterion selected from the group consisting of lead, ammonium, zinc and selected amine salts.

The remarkable and surprising discovery of the instant invention pertains to the following observation.

When small (or large) amounts of water are combined and mixed with solutions of the critically selected ionic polymers dissolved in the solvent as those described above, it is possible to convert such low viscosity systems into extremely viscous gels or solutions. Indeed, it is possible to achieve increases in viscosity by factors of $10^4$ (10,000) or more by the addition of only 5 to 15% water based on the polymer solution volume.

SUMMARY OF THE INVENTION

The present invention relates to a process for forming a viscous polymeric solution or gel having a viscosity of at least about 50,000 cps which includes the steps of dissolving an unneutralized or neutralized sulfonated polymer in a solvent to form a solution, a concentration of the unneutralized or neutralized sulfonated polymer in the solution being about 0.1 to about 20 wt. %, a viscosity of the solution being less than about 20,000 cps; and adding about 5 to about 500 vol. % water to the solution having a viscosity less than about 20,000 cps, the water being immiscible with the solvent and the solution, the viscosity of said solution increasing rapidly upon the addition of the water from less than 20,000 cps to greater than 50,000 cps.

Accordingly, it is a primary object of the instant invention to describe an economical process for forming a highly viscous or gelled polymeric solution having a viscosity greater than about 50,000 cps. preferably greater than 500,000 cps.

A further object of the instant invention is to provide a process for forming a gel solution which can be used as an encapsulating material, a coating material, as a means of forming a plug within a bore of an elongated member, or as a means of filling an opening in an article. In addition, this technique can be employed as an approach to join lubricating gels or greases which display a significant resistance to flow.

A still further object of the instant invention is to employ the instant process as an integral part of well control procedures which are initiated when unwanted pore fluid influxes have entered the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further pore fluid movement and avoid the risk of a catastrophic well blowout. This type of procedure would have several advantages over current, conventional well control methods which rely on the hydrostatic gradient of a heavy fluid placed in the annulus to control the well in the event of pore fluid influxes.

GENERAL DESCRIPTION

The present invention relates to a process for forming a polymeric solution having a viscosity of at least about 50,000 cps which includes the steps of dissolving an unneutralized or neutralized sulfonated polymer in a solvent to form a solution, a concentration of the unneutralized or neutralized sulfonated polymer in the solution being about 0.1 to about 20 wt. %, a viscosity of the solution being less than about 20,000 cps; and adding about 5 to about 500 vol. % water to the solution having a viscosity less than about 20,000 cps, the water being immiscible with the solvent and the solution, the viscosity of said solution increasing rapidly upon the addition of the water from less than 20,000 cps to greater than 50,000 cps.

If the boiling point of the organic liquid is greater than that of the water, the solution or gel having a viscosity greater than 50,000 cps can be heated to a temperature greater than the boiling point of the water but less than that of the organic liquid thereby isolating a gel of the unneutralized or neutralized sulfonated polymer in the organic liquid, when the water is boiled off. The formed gel can be further heated to a temperature above the boiling point of the organic liquid thereby removing part of the organic liquid from the liquid so as to cause formation of a more rigid gel. Alternatively, the solution having a viscosity greater than 50,000 cps can be heated to a temperature above the boiling point of the organic liquid and water thereby removing the organic liquid and water from said gel so as to cause formation of the solid unneutralized or neutralized sulfonated polymer. The gel can be coated onto a substrate of an article such as a cloth fabric, a polymeric material, glass, ceramic, metal or wood prior to the heating of the gel. When the gel is subsequently heated, a solid unneutralized or neutralized sulfonated polymeric coating will form on the surface of the substrate. Alternatively, the gel could be placed into an opening of the article thereby forming a solid plug within the opening upon application of heat to the gel. The gel could also be placed into the bore of an elongated member such as a pipe thereby forming a plug in the pipe upon application of heat to the gel. The article could also be suspended in the solution having the viscosity of less than 20,000 cps and thereby be encapsulated in the solution having a viscosity greater than 500,000 cps, when the water is added to the solution having a viscosity of less than 20,000 cps.

When the solution having a viscosity greater than 50,000 cps is formed by the addition of water to the solution having a viscosity less than 20,000 cps, the water interacts with the ionic polymer thereby causing gellation. The water can be removed from the solution phase by conventional liquid extraction methods. The formation of the solution having a viscosity of 500,000 cps from the solution having a viscosity less than 20,000 cps can be quite rapid in the order of less than 1 minute to about 24 hours, more preferably less than 1 minute to about 30 minutes, and most preferably less than 1 minute to about 10 minutes, however, this depends on temperature, shear, solvent type, etc.

The component materials of the instant process generally include an ionomeric polymer such as an unneutralized or neutralized sulfonated polymer, an organic liquid, and water.

In general, the ionomeric polymer will comprise from about 10 to about 200 meq. pendant ionomeric groups per 100 grams of polymer, more preferably from 10 to 100 meq. pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from zinc, ammonium and lead counterions and certain critically selected amine salts. The amine salts are derived from the neutralization of the sulfonic acids with $C_1$ to $C_{10}$ primary amines, with secondary amines containing from 2 to 6 carbons, and with tertiary amines containing from 3 to 6 carbon atoms (i.e., trimethylamine and triethylamine). All of these salts possess a sufficient solubility in organic liquids, while at the same time interact with water to form the gels of this invention. Ionic polymers which are subject to the process of the instant invention are illimitable and include both plastic and elastomeric polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated butyl rubber, sulfonated polyisoprene, and sulfonated elastomers and their copolymers.

Neutralization of the cited polymers with lead or ammonium hydroxide, zinc oxide or critically selected amine salts can be conducted by means well known in the art. For example, the sulfonation process as with Butyl rubber containing a small 0.3 to 1.0 mol % unsaturation can be conducted in a suitable solvent such as toluene with acetyl sulfate as the sulfonating agent such as described in U.S. Pat. No. 3,836,511. The resulting sulfonic acid derivative can then be neutralized with a number of different neutralization agents such as ammonium hydroxide. The amounts of such neutralization agents employed will normally be equal stoichiometrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention can be unneutralized, partially neutralized or substantially neutralized pendant groups and, in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones not be crosslinked and (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate tests (e.g., Polymer Handbook, Edited by Brandrup and Emmergut, Interscience Publishers, 1967, section IV-341). In the absence of appropriate polymer-solvent compatibility knowledge, this can be determined experimentally by observing whether the selected polymer will be soluble in the solvent at a level of 1 gm. polymer per 100 ml solvent. If the polymer is soluble, then this demonstrates that is is an appropriate backbone for modification with ionic groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred ionic copolymers for use in the instant invention, e.g., sulfonated polystyrene and substituted derivatives thereof, may be prepared by the procedures described in U.S. Pat. No. 3,870,841, filed on Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 0.2 to 10 weight %, most preferably from 0.5 to 5 weight % based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated propylene copolymers, sulfonated styrene-methyl methacrylate copolymers, (styrene)acrylic acid copolymers, sulfonated polyisobutylene, sulfonated ethylene-propylene terepolymers, sulfonated butyl rubber, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art; i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice-versa. The organic liquid is selected from the group consisting essentially of aromatic hydrocarbons, ketones, chlorinated aliphatic hydrocarbons, aliphatic hydrocarbons, cyclic aliphatic ethers, aliphatic ethers, paraffinic oils, diesel fuels, and organic aliphatic esters and mixtures thereof.

Specific examples of organic liquids to be employed with various types of polymers are:

| Polymer | Organic Liquid |
| --- | --- |
| Sulfonated polystyrene | Benzene, toluene, ethyl benzene, methylethyl ketone, xylene, styrene, ethylene dichloride, methylene chloride, |
| Sulfonated poly-t-butyl-styrene | Benzene, toluene, xylene, ethyl benzene, styrene, t-butyl styrene, aliphatic oils, aromatic oils, hexane, heptane, decane, nonane, pentane |
| Sulfonated ethylene-propylene terpolymer | Aliphatic and aromatic solvents, oils such as Solvent "100 Neutral", and "150 Neutral" and similar oils, benzene, diesel oil, toluene, xylene, ethyl benzene, pentane, hexane, heptane, octane, iso-octane, nonane, decane, aromatic solvents, ketone solvents |
| Sulfonated styrene-methyl-methacrylate-copolymer | Dioxane, halogenated aliphatics, e.g., methylene chloride, tetrahydrofuran |
| Styrene-acrylic acid copolymers | Aromatic solvents, ketone solvents, tetrahydrofuran, dioxane, halogenated aliphatics, e.g., methylene chloride |
| Sulfonated polyisobutylene | Saturated aliphatic hydrocar- |

-continued

| Polymer | Organic Liquid |
|---|---|
| | bons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons "Solvent 100 Neutral", "Solvent 150 Neutral" and all related oils, low molecular weight polymeric oils such as squalene, white oils and process oils having 60% or less aromatic content |
| Sulfonated polyvinyl toluene | Toluene, benzene, xylene, cyclohexane, ethyl benzene, styrene, methylene, chloride, ethylene dichloride. |

The amount of water added to the solution of neutralized sulfonated polymer, and organic liquid having a viscosity of less than about 20,000 cps, is about 5 to about 500 vol. % of water, more preferably about 10 to about 300 vol. % water, and most preferably about 10 to about 200 vol. % water.

DETAILED DESCRIPTION OF THE PREFERRED EMBODIMENTS

Example 1

A sulfonated polystyrene was prepared by dissolving 1248 g of polystyrene (Styron 666) in 6000 ml. of 1,2-dichloroethane at 50° C. To the solution was added 13.5 ml. of acetic anhydride followed by 36.5 ml. of concentrated sulfuric acid. The solution was stirred for one hour at 50° C. and then the sulfonated polymer was isolated by pouring the cement into boiling water and flashing off the solvent. The resultant polymer mass was washed with water and pulverized in a Waring blender and filtered. Five such runs were combined, and the resultant wet powder was dried in a Fitzpatrick Company fluid bed dryer with hot air at about 100° C.

The unneutralized sulfonated polystyrene contained 1.82 mole % sulfonic acid.

The modified polymer was dissolved in toluene at a concentration of 50 g/liter toluene. Water was added to 50 ml. samples of the solution, and the mixtures were mixed with a high speed stirrer to insure intimate mixing. Brookfield viscosities were obtained at 25° C. Results are given in Table I.

When the toluene solution was mixed with up to 40 volume % water the resultant mixtures appeared to be homogeneous. Viscosity increases were obtained but they were not very substantial. Above 40 volume % water the resultant mixtures separated and no further increases in viscosity were noted with increasing water concentration.

Example 2

A sulfonated polystyrene was prepared as described in Example 1 except that 73.5 ml. of acetic anhydride and 26.9 ml. of concentrated sulfuric acid were used. The sulfonated polymer contained 3.66 mole % sulfonic acid. The sulfonated polymer was dissolved in toluene at a concentration of 50 g/liter. Water was added at several levels, and the mixtures were mixed thoroughly as described in Example 1. Results are given in Table II.

Tremendous viscosity increases were noted when even as little as 0.5 volume % water was added. At water levels of 5–20 volume % viscosities of over 1,000,000 cps were obtained.

Example 3

A sulfonated polystyrene was prepared as described in Example 1 except that 110.3 ml. of acetic anhydride and 53.9 ml. concentrated sulfuric acid were used. The sulfonated polymer contained 5.67 mole % sulfonic acid. The sulfonated polymer was dissolved in 1,2-dichloroethane at a concentration of 50 g/liter DCE. Water was added at three levels, and the mixtures were mixed thoroughly as described in Example 1. Results are given in Table III.

Tremendous increases in viscosity were obtained at the 0.5 and 1.0 volume % water levels. At 2.0 volume % a gel formed whose viscosity could not be determined with the Brookfield viscometer.

This example demonstrates the use of halogenated solvents, as well as a higher sulfonate content polymer.

Example 4

A sulfonated polystyrene was prepared as described in Example 1 except that 147.0 ml. of acetic anhydride and 53.9 ml. of concentrated sulfuric acid were used. The sulfonated polymer contained 7.44 mole % sulfonic acid. The free polymeric sulfonic acid was dissolved in 1,2-dichloroethane at a concentration of 50 g/liter DCE. Water was added at three levels, and the mixtures were vigorously mixed as described in Example 1. Results are given in Table IV.

Very large viscosity increases were obtained when only up to 2.0 volume % water was added. This example illustrates the use of higher sulfonic acid level polymers.

TABLE I

| Example | I-A | I-B | I-C | I-D | I-E | I-F | I-G | I-H |
|---|---|---|---|---|---|---|---|---|
| Volume % H₂O Added | 0 | 10 | 20 | 30 | 40 | 50 | 75 | 100 |
| Brookfield Viscosity, cps at | | | | | | | | |
| 0.3 rpm | — | — | — | — | — | — | — | — |
| 0.6 | 3320 | 4980 | 13,280 | — | — | — | — | — |
| 1.5 | 3330 | 5330 | 11,990 | — | — | — | — | 2000 |
| 3.0 | 3000 | 3330 | 6660 | 2330 | 2660 | 9660 | — | 4330 |
| 6.0 | 660 | 3820 | 4150 | 4480 | 4650 | 6640 | 4150 | 2660 |
| 12.0 | — | 2500 | 4580 | 4080 | 4165 | 4750 | 1500 | 2080 |
| 30.0 | — | 1500 | 2860 | 3100 | 3663 | 2660 | 2065 | 1430 |
| 60.0 | — | 2390 | 2590 | 2790 | 3890 | 3560 | 1840 | 2000 |

TABLE II

| Example | II-A | II-A | II-C | II-D | II-E | II-F | II-F |
|---|---|---|---|---|---|---|---|
| Volume % H₂O Added | 0 | 0.5 | 1.0 | 2.0 | 5 | 10 | 20 |
| Brookfield Viscosity, cps | | | | | | | |
| at 0.3 rpm | — | 109,890 | 309,690 | 516,150 | 875,790 | 1,032,300 | 979,020 |
| 0.6 | — | 132,800 | 355,240 | 602,580 | 790,160 | 1,012,600 | 966,000 |

TABLE II-continued

| Example | II-A | II-A | II-C | II-D | II-E | II-F | II-F |
|---|---|---|---|---|---|---|---|
| 1.5 | — | 137,200 | 446,220 | 599,400 | — | — | — |
| 3.0 | 4995 | 178,820 | — | — | — | — | — |
| 6.0 | 5661 | — | — | — | — | — | — |
| 12.0 | 1170 | — | — | — | — | — | — |
| 30.0 | 470 | — | — | — | — | — | — |
| 60.0 | 170 | — | — | — | — | — | — |

TABLE III

| Example | III-A | III-B | III-C | III-D |
|---|---|---|---|---|
| Volume % H$_2$O Added | 0 | 0.5 | 1.0 | 2.0 |
| Brookfield Viscosity, cps | | | | |
| at 0.3 rpm | 6660 | 46,620 | 599,400 | >3,300,000 (Gel) |
| 0.6 | 4980 | 29,880 | 769,800 | — |
| 1.5 | 2660 | 53,280 | — | — |
| 3.0 | 2330 | 59,940 | — | — |
| 6.0 | 2160 | 76,360 | — | — |
| 12.0 | 1170 | — | — | — |

TABLE IV

| Example | IV-A | IV-B | IV-C | IV-D |
|---|---|---|---|---|
| Volume % H$_2$O Added | 0 | 0.5 | 1.0 | 2.0 |
| Brookfield Viscosity, cps | | | | |
| at 0.2 rpm | 9990 | 19,980 | 166,500 | 1,531,800 |
| 0.6 | 6640 | 21,580 | 149,400 | — |
| 1.5 | 2660 | 19,980 | 133,200 | — |
| 3.0 | 2330 | 33,300 | 153,180 | — |
| 6.0 | 1000 | 32,370 | — | — |
| 12.0 | 830 | 58,730 | — | — |

What is claimed is:

1. A process for forming a polymeric solution or water insoluble gel having a viscosity of at least about 50,000 cps which includes the steps of:
   (a) dissolving an unneutralized or neutralized sulfonated polymer in a solvent to form a solution, a concentration of said unneutralized or neutralized sulfonated polymer in said solution being about 0.1 to about 20 wt. %, a viscosity of said solution being less than about 20,000 cps; and
   (b) adding about 5 to about 500 volume % water to said solution, said water being immiscible with said solvent and said solution, the viscosity of said solution or suspension increasing upon the addition of said water from less than 20,000 cps to greater than 50,000 cps.

2. A process according to claim 1, wherein said organic liquid has a boiling point greater than said water.

3. A process according to claim 2, further including the step of heating said solution having a viscosity greater than 50,000 cps to a temperature greater than the boiling point of said water, but less than that of said organic liquid thereby isolating a water insoluble gel of said unneutralized or neutralized sulfonated polymer in said organic liquid.

4. A process according to claim 3, further including heating said gel to a temperature above the boiling point of said organic liquid thereby removing said organic liquid from said water insoluble gel to form a solid unneutralized or neutralized sulfonated polymer.

5. A process according to claim 3, further including the step of depositing said water insoluble gel on a substrate prior to heating said gel to said temperature above said boiling point of said organic liquid thereby forming a coating of said ununneutralized or neutralized sulfonated polymer on said substrate.

6. A process according to claim 1 further including the step of heating said solution and said water to a temperature above the boiling points of said water, and said organic liquid forming from neutralized sulfonated polymer.

7. A process according to claim 1, further including the step of separating said water from said solution having a viscosity greater than 50,000 cps thereby forming a water insoluble gel of said unneutralized or neutralized sulfonated polymer in said organic liquid.

8. A process according to claim 7, further including suspending an article in said solution having a viscosity less than about 20,000 cps, thereby permitting said water insoluble gel to be encapsulated within said substance having a viscosity greater than 50,000 cps upon the addition of said water to said solution having a viscosity less than about 20,000 cps.

9. A process according to claim 1, further including an article having an opening therein and forming said solution having a viscosity greater than 50,000 cps within said opening.

10. A process according to claim 1, further including an elongated member having a bore therein and forming said solution having a viscosity greater than 500,000 cps within said bore.

11. A process according to claim 1, wherein said neutralized sulfonated polymer has about 10 to about 200 meq. of pendant SO$_3$H groups per 100 grams of polymer.

12. A process according to claim 11, wherein said SO$_3$H are neutralized with an ammonium, zinc lead or amine salt counterion.

13. A process according to claim 12, wherein said SO$_3$H groups are at least 90 mole % neutralized.

14. A process according to claim 1, wherein said neutralized sulfonated polymer is formed from an elastomeric polymer.

15. A process according to claim 14, wherein said elastomeric polymer is selected from the group including EPDM terpolymer and Butyl rubber.

16. A process according to claim 1, wherein said neutralized sulfonated polymer is formed from a thermoplastic.

17. A process according to claim 16, wherein said thermoplastic is selected from the group consisting of polystyrene, t-butyl styrene, ethylene copolymers, propylene copolymers, and styrene/acrylonitrile copolymer.

18. A process according to claim 1, wherein said neutralized sulfonated polymer further includes a filler admixed therewith.

19. A process according to claim 1, wherein said neutralized sulfonated polymer further includes a polymeric substance admixed therewith.

20. A process according to claim 1, wherein said organic liquid is selected from the group including aromatic hydrocarbons, ketones, chlorinated aliphatic hydrocarbons, aliphatic hydrocarbons, cyclic aliphatic ethers, aliphatic ethers and organic aliphatic esters and mixtures thereof.

21. A process according to claim 1, wherein said organic liquid is selected from the group consisting of diesel fuels, paraffinic oils, aliphatic hydrocarbons and aromatic hydrocarbons.

22. A process according to claim 1, wherein said organic liquid is selected from the group consisting of benzene, toluene, ethyl benzene, xylene and styrene and mixtures thereof.

23. A process according to claim 22, wherein said neutralized sulfonated polymer is formed from polystyrene.

24. The process of claim 1 where the viscosity of the solution is less than 20,000 cps and increases with water addition to greater than 500,000 cps.

25. A process according to claim 1, wherein said organic liquid is selected from the group consisting of oils which are predominantly paraffinic in composition.

* * * * *